Patented Nov. 3, 1936

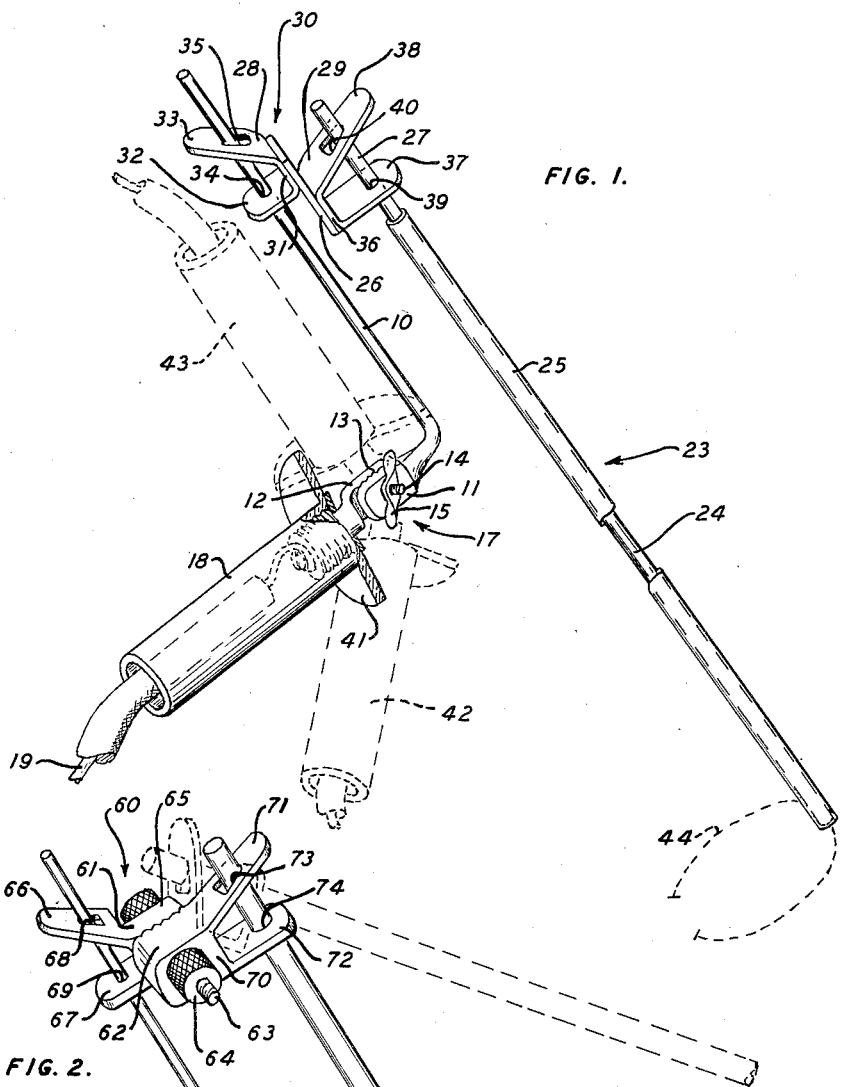

2,059,605

UNITED STATES PATENT OFFICE 2,059,605

WELDING DEVICE

Raymond E. Powell, Westfield, N. J., assignor to Western Electric Company, Incorporated, New York, N. Y., a corporation of New York Application August 24, 1935, Serial No. 37,693

13 Claims. (Cl. 219—8)

This invention relates to a welding device, and more particularly to an adjustable device for holding welding rods.

For some kinds of welding a long slender coated metal rod is used. In operation it is held by an insulated holding device, which is secured to the end of the rod opposite the arc or working point.

An object of the present invention is to provide a simple, reliable, and adjustable means for holding a welding rod and for applying the end thereof steadily and accurately to the work.

One embodiment of the invention may include a supporting rod of metal attached by a swivel to a hollow handle of insulating material, to be adjustably positioned at a variety of angles to the handle, the rod carrying a device, which can be readily adjusted to stand at any point on the rod and which is provided with clamp means to hold a welding rod.

Other objects and features of the invention will appear from the following detailed description of one embodiment of the invention taken in conjunction with the accompanying drawing in which like reference numbers are applied to the same parts in the several figures and in which Fig. 1 is a perspective view of a welding device constructed in accordance with the invention and having a welding rod held therein, and Fig. 2 is a perspective view of another form of the welding device, having a welding electrode held therein.

Referring to Fig. 1, which shows a preferred form of the invention, a handle 18 is made of insulating material tubular in form and is rigidly secured to a projecting portion of a block 12 which is one member of a swivel means generally indicated at 17.

The swivel means 17 comprises the block 12, a block 11 coacting therewith, and a clamp screw 14 passing through the two blocks and having a clamp nut 15 threaded thereon. The block 11 may be the enlarged integral end of a supporting rod 10 of copper or other suitable conductive material, preferably standing at right angles thereto. Normally the rod 10 is adjusted to stand at right angles to the handle 18 as shown in full lines in Fig. 1.

A clamp member generally indicated at 30 is slidably mounted on the elongated metal support 10 to be adjustable thereon and comprises a body member 26 having two spring clamp members 28 and 29 secured thereto. The member 28 comprises a piece of resilient sheet metal formed with a back portion 31 and two integral ears 32 and 33, these ears having perforations as at 34 and 35 respectively through which the rod 10 passes. The rod clamping member 29 is similarly formed with a back portion 36, and ears 37 and 38 having perforations 39 and 40 respectively.

An insulated power supply conductor 19 to supply power from a source of electric current not shown, passes through the hollow insulating handle 18 and is connected to the block 12. The handle may also be formed with a guard 41 formed integral therewith and having the form of a circumferential fin on the outer end of the handle.

Referring to Fig. 2 which shows another embodiment of the invention, the handle 50 is made of insulating material tubular in form and is rigidly secured thereon to the end 52 of a rod 53. The end 52 may be the enlarged integral end of the supporting rod 53 which is of copper or other suitable conductive material and preferably standing at right angles to the end 52.

A clamp and swivel member generally indicated at 60 is slidably mounted on the rod 53 to be adjustable thereon and comprises a member 61, a member 62 coacting therewith, and a clamp screw 63 passing through the two members and having a clamp nut 64 threaded thereon. The member 61 comprises a solid metal body member 65 and two resilient metal ears 66 and 67 integral therewith, these ears having perforations as at 68 and 69 respectively through which the rod 53 passes. The rod clamping member 62 is similarly formed with a body portion 70, and ears 71 and 72 having perforations 73 and 74 respectively.

An insulated power supply conductor 19 to supply power from any suitable source of electric current not shown, passes through the hollow insulating handle 50 and is connected to the end 52 of rod 53. The handle may be provided with a guard 51.

In operation a welding rod or electrode, generally indicated at 23 (Fig. 1), having a core 24 of welding metal, for example of iron or some iron alloy, and a coating 25 of fluxing material or the like covering the rod with the exception of a short portion 27 at one end thereof, is inserted into the perforations 39 and 40 of the clamp 30 and is removably held therein by the resilience of the ears 37 and 38, the bare end 27 of the rod being used for this purpose.

The device is then ready for use in depositing material from the core 24 on a piece of work to be welded, in the manner customary in arc welding, the welding current passing from the source not shown through the wire 19, the block 12, the block 11, the elongated metal support 10, the clamp 30 and the core 24 to the work and to ground or to a return.

As thus constructed and adjusted, the device including the rod 23 (Fig. 1) is well balanced in the hand of the operator and the free end of the rod is relatively near the handle. Hence the application of the free end of the rod to the work is easily controllable in an accurate manner. As the rod 23 is melted away, the clamp 30 may be progressively shifted along the rod 10 toward the handle to adjust the working end of the rod 23 to the position most handy and convenient with respect to the handle.

In some instances, as for example in working in the interior of a hollow piece of work or in working overhead, it will be convenient to adjust the handle to such a position as is shown at 42 or 43 (Fig. 1). Also the metallic clamp 30 is self evidently rotatable through a considerable arc 44 about the rod 10 as an axis, so that the working end of the rod 23 may assume any position desired relative to the rod 10 and handle 18 along the arc 44.

It is to be noted also that the combination of the clamp 30 (Fig. 1) sliding along the rod 10 allows substantially the whole length of the rod 23 to be consumed without any shifting of the rod 23 in the clamp, or reversal of the device in the hand to use the other end of the rod 23, which would necessitate an interruption of the welding operation.

As herein disclosed the block 11 (Fig. 1) is shown as bent at right angles to the rod 10, but evidently it may equally well be in line therewith provided the clamp 30 affords convenient spacing between the rods 10 and 23.

The operation of the form of device shown in Fig. 2 will be clear from an inspection of the figure and comparison with the device of Fig. 1, with the exception of the rod 83 which as here shown may be a carbon rod used in another mode of welding to conduct the current and to act as one electrode of an arc. A welding rod is independently fed to the arc at the working point.

In another embodiment of the invention herein disclosed the device shown in Fig. 1 or Fig. 2 might be used without the power supply conductor 19 or any means of electrical current supply merely being used to hold and feed a rod to the point on the work, where it is melted by means of a welding torch or carbon arc independently applied.

The embodiments of the invention herein disclosed are merely illustrative and may be modified and departed from in many ways without departing from the spirit and scope of the invention as pointed out in and limited by the appended claims.

What is claimed is:

1. A device for arc welding comprising a handle, supporting means mounted on the handle to be adjustable thereon, rod clamping means mounted on the supporting means to be bodily adjustable thereon and for holding a welding rod, and means to conduct an electrical current to the rod.

2. A device for arc welding comprising a handle, supporting means mounted on the handle to be pivotally adjustable thereon, rod clamping means mounted on the supporting means to be slidably bodily adjustable thereon and for holding a welding rod, and means to conduct an electrical current to the rod.

3. A device for arc welding comprising a handle, supporting means mounted on the handle to be slidably adjustable thereon, means mounted on the supporting means to be pivotally adjustable thereon and for holding a welding rod, and means to conduct an electrical current to the rod.

4. A device for arc welding comprising a handle of insulating material, a conductive member secured thereto and having means for attaching an electrical conductor, an elongated metal support adjustably mounted on the member, a metallic member bodily adjustably mounted on the support and means on the metallic member to hold a welding rod.

5. A device for arc welding comprising a handle of insulating material, an elongated metal support mounted on the handle and having means for attaching an electrical conductor, a metallic member bodily slidably adjustable thereon and means on the metallic member to hold a welding rod.

6. A device for arc welding comprising a tubular handle of insulating material, a conductive member secured thereto and having means for attaching an electrical conductor, a metal rod adjustably pivotally mounted on the member, a metallic member adjustably mounted on the rod to be slidable and rotatable thereon, and means on the metallic member to receive and removably hold a welding rod.

7. A device for arc welding comprising a tubular handle of insulating material, a metal rod secured thereto and having means for attaching an electrical conductor, a metallic member adjustably mounted on the rod to be slidable and rotatable thereon, and pivotally adjustable means on the metallic member to receive and removably hold a welding rod.

8. A device for welding comprising a handle of insulating material, an elongated metal support adjustably mounted on the handle, a metallic member bodily adjustably mounted on the support and means on the metallic member to hold a welding rod.

9. A device for welding comprising a tubular handle of insulating material, a metal rod adjustably pivotally mounted on the handle, a metallic member adjustably mounted on the rod to be slidable and rotatable thereon, and means on the metallic member to receive and removably hold a welding rod.

10. A device for welding comprising a tubular handle of insulating material, a metal rod secured thereto, a metallic member adjustably mounted on the rod to be slidable and rotatable thereon, and pivotally adjustable means on the metallic member to receive and removably hold a welding rod.

11. A device for arc welding comprising a handle, supporting means mounted on the handle to be adjustable thereon, electrode clamping means mounted on the supporting means to be bodily adjustable thereon and for holding an electrode, and means to conduct an electrical current to the electrode.

12. A device for arc welding comprising a handle, supporting means mounted on the handle to be pivotally adjustable thereon, electrode clamping means mounted on the supporting means to be slidably bodily adjustable thereon and for holding an electrode and means to conduct an electrical current to the electrode.

13. A device for arc welding comprising a handle, supporting means mounted on the handle to be slidably adjustable thereon, means mounted on the supporting means to be pivotally adjustable thereon and for holding an electrode, and means to conduct an electrical current to the electrode.

RAYMOND E. POWELL.